Nov. 28, 1933.                D. L. MATHIAS                1,936,799
                              WELDING ELECTRODE
                              Filed May 16, 1931

WITNESSES:
R. S. Williams
Robert E. Sadtler.

INVENTOR
David L. Mathias.
BY
ATTORNEY

Patented Nov. 28, 1933

1,936,799

UNITED STATES PATENT OFFICE 1,936,799

WELDING ELECTRODE

David L. Mathias, Pittsburgh, Pa., assignor to Westinghouse Electric & Manufacturing Company, a corporation of Pennsylvania Application May 16, 1931. Serial No. 537,795

4 Claims. (Cl. 219—8)

My invention relates to welding electrodes and more particularly to electrodes or rods having flux coatings or interior cores containing a flux.

The principal object of my invention is to provide a welding electrode having a flux coating or core, said electrode being characterized by having a high melting rate and deep penetration into the work metal.

Another object of my invention is to produce a ductile welded joint which shall be relatively free from contained oxides and nitrides.

A further object of my invention is to provide a welding electrode having a flux coating or core which shall be capable of producing a reducing or non-oxidizing atmosphere when the electrode is utilized in an electric-arc-welding operation.

It is well known in the welding art that oxides and nitrides accumulate in the molten metal produced in normal welding operations by the electric-arc-welding method. These compounds have a detrimental effect on the weld and become more or less segregated along the grain boundaries as the molten metal cools. Experiments have demonstrated that the fracture in a weld containing oxides and nitrides always occurs along the grain boundaries, because the amount of such impurities is especially great in that location. The segregation of the oxides and nitrides, therefore, so weakens the weld that it is easily fractured when force is applied to the work metal. Consequently, some means for preventing the inclusion of such compounds within the weld is highly desirable.

I have made the discovery that, by coating electrodes or welding rods or providing them with cores of a composition comprising a clay, an alkaline compound, a ferrous-base allow and a resinate, or a mixture of compounds capable of reacting to form a resinate a non-oxiding or reducing gas will be produced and a protective slag will be formed which will shield the metal as it is deposited during the welding operation.

Figure 1:
Figure 3:
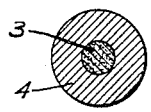
Figure 2:
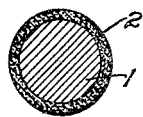

My invention will be better understood by reference to the accompanying drawing, in which, Figure 1 is a plan view of my improved flux-coated welding electrode, a portion of the coating composition being broken away to show the electrode, Fig. 2 is a cross-sectional view taken along the line II—II of the electrode shown in Fig. 1, and Fig. 3 is a similar view showing a modified form of the electrode.

Referring to Figs. 1 and 2 of the drawing, the numeral 2 designates a coating composition baked on a metallic electrode 1. I prefer to utilize a flux comprising a clay or silicate and an alkaline salt as the major ingredients, and a ferrous-base alloy and a resinate, or a mixture of ingredients capable of reacting to form a resinate, as the minor ingredients, a sufficient amount of a binding agent being present to cement the flux to the electrode. In order to obtain satisfactory results, it is essential that the acid and basic constituents shall be of such composition and so proportioned as to be capable of reacting together to form a protective slag of the proper fluidity upon the arc-deposited metal.

The coating composition may be prepared by grinding from 80 to 90 parts by weight of a resin such as rosin amber or dammar or the acids which constitute the major proportions of such resins, such as abietic acid from 10 to 20 parts, by weight, of an alkaline compound, such sodium carbonate, together until a finely-powdered mixture is formed which is heated to a temperature of about 150° C., or to the melting point of the resin. A reaction between the alkaline compound and the resin occurs to form a resinate. The resinate, thus formed, is then powdered and mixed with a clay or a silicate, an alkaline salt and ferrous-base alloy in suitable proportions. An aqueous solution of sodium or potassium silicate, in an amount equal to about 5% to 20% of the mixture previously formed, is then added, and a pasty or viscous mixture is thus formed which is ready to be applied to the electrode.

The flux may be applied to the electrode by immersing it in the mixture or suspension or the coating may be brushed on the electrode or pressed on by suitable mechanical means, such as extrusion means. The coating is then heated at a temperature of 90° to 100° C. for a period of from 15 minutes to 8 hours to eliminate the water and harden the flux.

Other methods of applying the flux may be utilized, and I, therefore, do not desire to limit myself with respect to any particular process. For example, the binding agent may be omitted and the flux composition applied by any suitable method, such as dusting. The thickness of the coating may be regulated as desired by varying the number of immersions of the electrode in the mixture or by varying the viscosity of the mixture or suspension, or by varying the diameter of the extruding die.

Instead of coating the electrode in the foregoing manner, I may form a hole 3 lengthwise through the electrode 4 and then fill the hole with my improved composition by any suitable method, such as extrusion. In such cases, it is not necessary to utilize a binder. Since the resinates, however, generate a substantial quantity of gases during the welding operation, it is essential, in utilizing a cored electrode, that the amount of flux should be limited to prevent excessive arc disturbances.

If a binder is utilized, the cored electrode is placed in an oven suitably heated, as by electrical energy, and subjected to a sufficient temperature for a sufficient period of time to eliminate the water and harden the flux. A firmly adherent core is thus provided which will not readily crack or loosen from the electrode.

For economical reasons, I prefer to apply the flux as a coating and, because if it is applied to the surface, it affords a better shield during the welding operation. As a general rule, the ratio of the volume of my improved flux to the electrode should be at least 50% to 150%, by volume. I have found it desirable to form relatively heavy coatings on small electrodes and relatively light coatings on large heavy electrodes. Sufficient flux, however, should be applied to effectively shield the arc stream, and, since the volume of the core increases as the square of the diameter, while the circumference only increases in proportion to the diameter, more flux in proportion to the volume is required for small electrodes than for large ones. When high current densities are utilized, it is generally necessary to increase the amount of the flux coating on the electrode because a greater amount of the composition is volatilized or oxidized and lost under such conditions.

The nature and proportion of the ingredients utilized in my improved flux will depend, in general, upon the alloying or deoxidizing ingredients to be introduced into the weld, the amount of non-oxidizing or reducing gas to be generated, the amount and viscosity of the slag, and upon the desired melting rate of the electrode and its penetration into the work metal.

I prefer to employ a mixture or suspension comprising from 45 to 65 parts, by weight, of a clay, such as kaolin, china clay, or a synthetic silicate, for example, one formed by heating silica and aluminum or iron oxide together or mixtures thereof, 20 to 30 parts, by weight, of an alkaline compound, such as calcium or magnesium carbonate or oxide or mixtures thereof, 10 to 20 parts, by weight, of a deoxidizer, such as manganese, titanium or vanadium or the ferrous alloys of these metal alloys, or mixtures thereof, and about 10 to 20 parts, by weight, of a resinate, such as sodium, potassium, calcium, barium or manganese resinates, or mixtures thereof, suspended in from 5% to 20% of an aqueous solution of sodium or potassium silicate.

I have found that an especially suitable composition may be formed by employing 50 parts of kaolin, 20 parts of marble, 10 parts of a ferromanganese alloy containing approximately 80% manganese, and 20 parts, by weight, of sodium resinate.

Instead of utilizing the resinates themselves, ingredients capable of forming resinates during the preparation and application of the flux may be employed. For example, in the specific illustration given, instead of utilizing 20 parts of sodium resinate, about 16 parts of a resin and about 4 parts of sodium carbonate may be substituted.

The amount of marble or alkaline compound in the resinate environment employed will depend upon the amount of silicate present in the flux and also upon the desired viscosity of the slag which is formed. It will, of course, be understood that the clay or silicate reacts or forms a solution with the alkaline compound during the welding operation, thereby producing a slag upon the surface of the deposited metal which serves to protect it against contamination.

In general, I prefer to utilize a basic compound which is capable of liberating a large amount of carbon dioxide during the welding operation in order to prevent the oxidation of the arc-deposited metal and to produce a porous slag which may be readily removed.

The amount of deoxidizer in the ferrous alloy employed, such as ferromanganese, will, in general, depend upon the deoxidizing effect which is desired and also upon the amount of the alloying ingredients which are to be introduced into the weld. I prefer, however, to utilize from 10% to 15% of a ferrous alloy having a manganese content of from 80% to 90%, the amount of deoxidizing material being maintained high in order to ensure the deoxidization of the weld.

The amount of resinate or resinate-forming substances employed, will, in general, depend upon the amount of non-oxidizing or reducing gas to be generated, upon the arc-stability, and also upon the character of the slag formed. The decomposition of the resinate produces an envelope of non-oxidizing or reducing gases which serve to shield the arc-stream and arc-deposited metal.

By varying the relative proportions of the acid and basic ingredients, as stated previously, or by the selection of the proper silicates I may alter the fluidity characteristics of the slag, as desired. In general, a very viscous slag is desirable for overhead welding or where an adherent slag is desired on the top of the arc-deposited metal. However, it is usually highly desirable to have the slag in a fluid state so that it will float to the surface of the weld and not be included within the arc-deposited metal.

My improved coating may be applied to, or inserted as a core composition in a low-carbon steel rod having a carbon content of about .01% to .35%, or electrodes formed of other alloys, such as nickel-chromium, or nickel-vanadium. In applying it to special steel electrodes, however, a larger amount of flux composition is usually required to produce an electrode having the most desirable welding characteristics.

By employing my improved coated or cored electrode in electric-arc welding, the operation is more economical, as the speed of the operation is greatly increased, because of the superior penetration obtained. Furthermore, a non-porous ductile weld having high tensile strength is produced which is not contaminated and weakened by the inclusion of oxides and nitrides.

While I have disclosed my invention in considerable detail and have given specific examples, it will be understood that these examples are to be construed as illustrative and not by way of limitation. Other modifications of my invention will become apparent to those skilled in the art without departing from the spirit and scope of my invention. It is, therefore, desired that only such limitations shall be imposed as are indicated in the appended claims.

I claim as my invention:

1. A flux coating for welding electrodes comprising about 45 to 66 parts of kaolin, about 20 to 30 parts of calcium carbonate, about 10 to 20 parts of a ferromanganese alloy and about 10 to 20 parts of sodium resinate.

2. A welding electrode having in combination flux comprising a quantity of resinate to supply reducing gas for protecting metal in welding, alkaline compound to afford basic conditions in the resinate environment and silicate to minimize loss of the resinate in welding.

3. A welding electrode having in combination a quantity of resinate to supply reducing gas for protecting metal in welding, deoxidizer to protect the resinate against oxidation, alkaline compound to afford basic conditions in the resinate environment and flux to minimize loss of resinate in welding.

4. A welding electrode having in combination flux comprising a quantity of resinate to supply reducing gas for protecting metal in welding, and silicate to minimize loss of the resinate in welding, said resinate being about 10 to 20 percent by weight of the flux.

DAVID L. MATHIAS.